US008521915B2

(12) United States Patent
Kishore et al.

(10) Patent No.: US 8,521,915 B2
(45) Date of Patent: Aug. 27, 2013

(54) COMMUNICATING BETWEEN HOST COMPUTERS AND PERIPHERAL RESOURCES IN AN INPUT/OUTPUT (I/O) VIRTUALIZATION SYSTEM

(75) Inventors: Karagada R. Kishore, Saratoga, CA (US); Kiron Malwankar, Saratoga, CA (US); Peter E. Kirkpatrick, San Francisco, CA (US)

(73) Assignee: Fusion-io, Inc., Salt Lake City, UT (US)

( * ) Notice: Subject to any disclaimer, the term of this patent is extended or adjusted under 35 U.S.C. 154(b) by 0 days.

(21) Appl. No.: 12/790,920

(22) Filed: May 31, 2010

(65) Prior Publication Data

US 2011/0055433 A1 Mar. 3, 2011

Related U.S. Application Data

(63) Continuation-in-part of application No. 12/751,543, filed on Mar. 31, 2010, now Pat. No. 8,412,860.

(60) Provisional application No. 61/234,972, filed on Aug. 18, 2009.

(51) Int. Cl.
*G06F 3/00* (2006.01)
(52) U.S. Cl.
USPC .................................. 710/10; 710/9
(58) Field of Classification Search
USPC ............................................................ 710/9
See application file for complete search history.

(56) References Cited

U.S. PATENT DOCUMENTS

| 7,188,209 | B2 | 3/2007 | Pettey et al. |
|---|---|---|---|
| 7,327,748 | B2 | 2/2008 | Montalvo et al. |
| 7,492,723 | B2 * | 2/2009 | Boyd et al. ................. 370/252 |
| 7,506,094 | B2 | 3/2009 | Boyd et al. |
| 7,529,860 | B2 * | 5/2009 | Freimuth et al. ................. 710/8 |
| 7,633,955 | B1 | 12/2009 | Saraiya et al. |
| 7,752,376 | B1 | 7/2010 | Johnsen et al. |
| 2004/0003141 | A1 | 1/2004 | Matters et al. |
| 2006/0195620 | A1 | 8/2006 | Arndt et al. |
| 2006/0212606 | A1 | 9/2006 | Arndt et al. |
| 2006/0230181 | A1 | 10/2006 | Riley |
| 2006/0242330 | A1 * | 10/2006 | Torudbakken et al. ........... 710/5 |
| 2006/0242352 | A1 | 10/2006 | Torudbakken et al. |
| 2007/0094378 | A1 | 4/2007 | Baldwin et al. |
| 2008/0126648 | A1 | 5/2008 | Brownlow et al. |

(Continued)

OTHER PUBLICATIONS 2380.2.87, U.S. Appl. No. 12/790,921, Office Action, May 1, 2012.

(Continued)

*Primary Examiner* — Chun-Kuan Lee
*Assistant Examiner* — Ronald Modo

(57) ABSTRACT

An Input/Output (IO) Virtualization (IOV) system provides for sharing of computer peripheral devices between multiple host computers by presenting a single device multiple times to numerous host systems. The IOV system, in coupling or connecting multiple host computers and multiple IO devices, provides IO virtualization and host-to-host communication services to the host computers. The system comprises device interfaces coupled to IO devices, and host interfaces coupled to each of a number of host computers. The IO devices are initialized in a first domain. Each host interface exposes functions of the independent IO devices to the host computer to which it is coupled. Each host computer accesses functions from a host domain that is an independent domain specific to the host computer performing the access. The first domain is different from the host domain.

106 Claims, 6 Drawing Sheets

(56) References Cited

U.S. PATENT DOCUMENTS

| | | |
|---|---|---|
| 2008/0195756 A1 | 8/2008 | Galles |
| 2008/0222338 A1 | 9/2008 | Balasubramanian et al. |
| 2008/0270599 A1* | 10/2008 | Tamir et al. .................. 709/224 |
| 2008/0288661 A1* | 11/2008 | Galles .............................. 710/3 |
| 2008/0288664 A1 | 11/2008 | Pettey et al. |
| 2009/0248947 A1* | 10/2009 | Malwankar et al. .......... 710/316 |
| 2010/0115174 A1 | 5/2010 | Akyol et al. |
| 2011/0029695 A1* | 2/2011 | Kishore et al. .................... 710/9 |
| 2011/0106981 A1* | 5/2011 | Watkins et al. ................... 710/9 |

OTHER PUBLICATIONS 2380.2.87, U.S. Appl. No. 12/790,921, Office Action, Sep. 30, 2011.

2380.2.86, U.S. Appl. No. 12/751,543, Office Action, Feb. 7, 2012.

2380.2.86, U.S. Appl. No. 12/751,543, Office Action, Jul. 20, 2011.

2380.2.86pct, Application No. PCT/US2010/029433, International Preliminary Report on Patentability, Jun. 2, 2010.

2380.2.86pct, Application No. PCT/US2010/029433, International Search Report, Jun. 2, 2010.

Virtensys, "Virtensys First to Deliver PCI Express-Based I/O Virtualization Switches to Customers", Virtualization Technology News and Information, pp. 6, downloaded Jan. 1, 2013, http://vmblogcom/archive/2009/02/23/ virtensys-first-to-deliv er-pci-expr . . .

2380.2.74pct, Application No. PCT/US2010/45730, International Search Report and Written Opinion, Nov. 15, 2010.

2380.2.74EP, Application No. 10810470.4, European Search Report, Jan. 7, 2013.

* cited by examiner

COMMUNICATING BETWEEN HOST COMPUTERS AND PERIPHERAL RESOURCES IN AN INPUT/OUTPUT (I/O) VIRTUALIZATION SYSTEM

RELATED APPLICATIONS

This application claims the benefit of U.S. Patent Application No. 61/234,972, filed Aug. 18, 2009.

This application is a continuation in part of U.S. patent application Ser. No. 12/751,543, filed Mar. 31, 2010.

This application is related to U.S. patent application Ser. No. 12/265,695, filed Nov. 5, 2008.

This application is related to U.S. patent application Ser. No. 12/353,659, filed Jan. 14, 2009.

TECHNICAL FIELD

The disclosure herein relates generally to network architectures.

BACKGROUND

Conventional technologies include a standard known as single-root input/output virtualization (SR-IOV) for PCI Express® (PCIe) devices. The SR-IOV allows multiple operating systems running simultaneously within a single computer to natively share PCIe devices by providing native input/output (IO or I/O) virtualization in PCIe topologies where there is a single root complex. The single root complex typically indicates a central processing complex with a single chipset, where the PCIe root complex resides. Therefore, SR-IOV allows multiple guest operating systems running in a virtual machine environment on a single processing complex to access multiple functions in a SR-IOV capable device.

Multi-root IOV (MR-IOV) has also been specified, which builds on SR-IOV to provide native I/O virtualization in topologies in which multiple root complexes share a PCIe hierarchy. The MR-IOV, however, requires implementation at the fabric, endpoint, and system levels that has not been realized to date.

Additionally, conventional technologies include proprietary systems that have been developed to implement IO virtualization. However, these systems do not provide native, transparent PCIe connections to the hosts and IO devices in the system and, further, require proprietary IO resource modules or drivers to run on the hosts.

Fiber Channel over Ethernet (FCoE) is another conventional technology that allows for tunneling storage traffic using a Fiber Channel protocol to be encapsulated in ethernet frames and transported on an ethernet fabric. However, extensive infrastructure replacement will be necessary to implement FCoE, like required replacement of the switching fabric, IO devices, and drivers associated with the client-server (ethernet) and storage (fiber channel) networks.

Conventional systems also include ExpressEther, which is a system architecture that provides a mechanism to transport PCIe traffic over an ethernet fabric. However, the system does not provide sharing of PCIe devices at the function level, but only serial assignment of an entire device to a given host. Moreover, the system does not provide for host-to-host communications.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

An Input/Output (IO) Virtualization (IOV) system is described herein that provides a mechanism for sharing computer peripheral devices or resources between multiple host computers. This sharing of a single device across multiple host systems is referred to as "Input/Output Virtualization" because a single resource is presented multiple times to numerous host systems. The IOV system, in coupling or connecting multiple host computers and multiple IO devices to a managed transport fabric, provides IO virtualization and host-to-host communication services to the host computers. The host computers may be of any type or size, and may run any operating system or hypervisor to provide a virtualized environment for guest operating systems. The host interface to the IOV system is PCI-Express (PCIe), which is available on nearly every modern computer, particularly server class machines. The IO devices are PCIe based to provide maximum compatibility with industry standard devices, but are not so limited.

In the following description, numerous specific details are introduced to provide a thorough understanding of, and enabling description for, embodiments of the present invention. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1A:
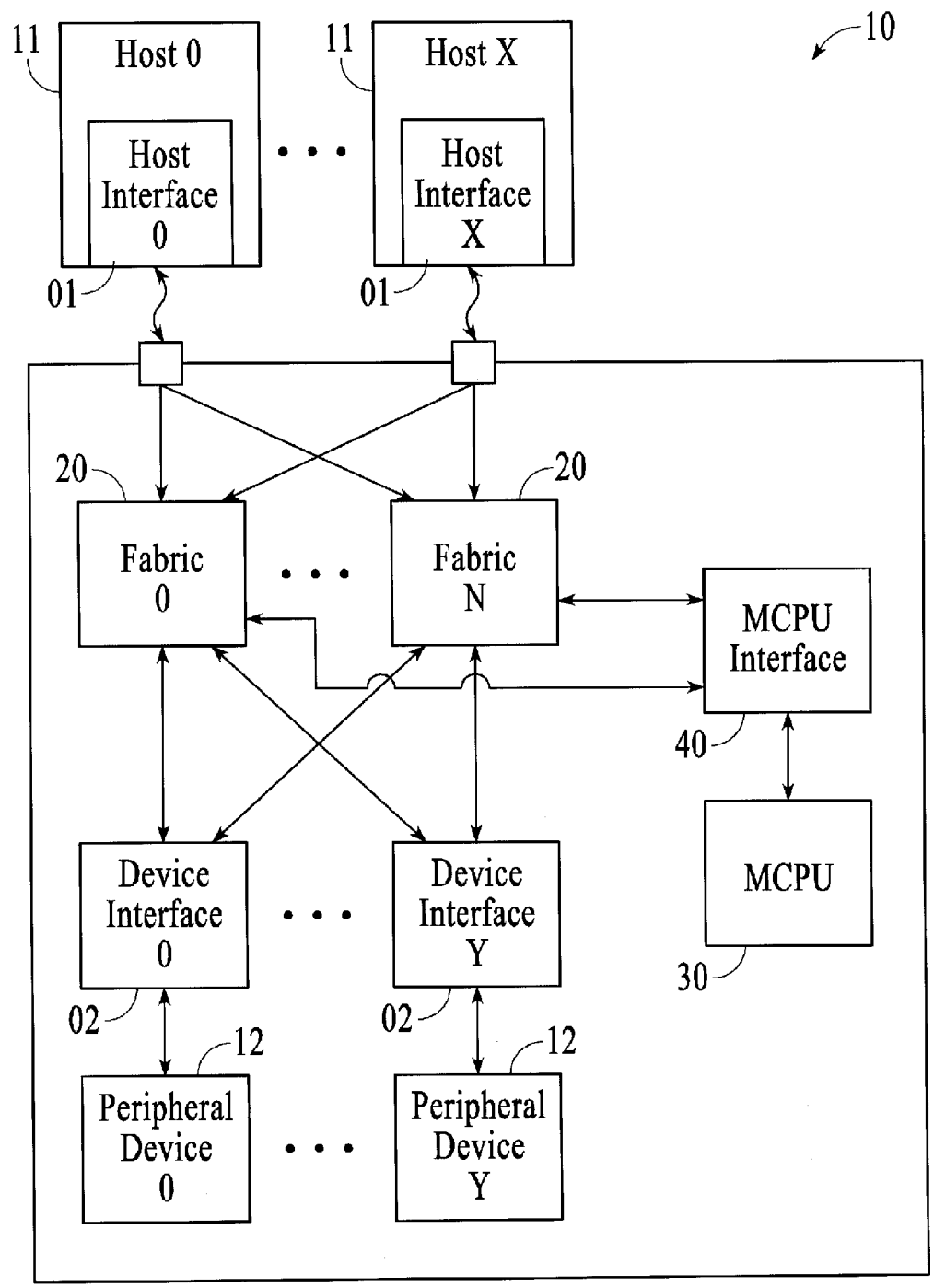
FIG. 1A is a block diagram of the Input/Output Virtualization (IOV) System, under an embodiment.

FIG. 1A is a block diagram of the Input/Output Virtualization (IOV) System 10, under an embodiment. The IOV system 10 comprises a number of IOV interface devices 01-02. The IOV interface devices of an embodiment include host interface devices 01 coupled or connected to host computers 11, where at least one host interface device 01 is coupled or connected to at least one host computer 11 (e.g., Host Interface 0 coupled or connected to Host 0 (Computer), Host Interface X coupled or connected to Host X (Computer), where X is any number). The IOV interface devices of an embodiment also include endpoint interface devices 02 coupled or connected to IO devices 12, where at least one endpoint interface device 02 is coupled or connected to at least one IO device 12 (e.g., Device Interface 0 coupled or connected to Peripheral Device 0, Device Interface Y coupled or connected to Peripheral Device Y (where Y is any number)). Host computer interfaces 01 and device interfaces 02 are in the form of high-speed digital logic devices such as FPGA or ASIC devices, but are not so limited.

The IOV system further includes a transport fabric 20. The transport fabric 20 is a scalable, low-latency, high-bandwidth interconnection fabric that couples or connects the host computers 11, the IO devices 12, and the IOV interface devices 01-02 to the system. A management CPU (MCPU) 30 of an embodiment couples or connects to the transport fabric 20 via an interface referred to herein as the MCPU interface 40. The MCPU interface can also be an FPGA or ASIC device(s) and/or implemented in software, but the embodiment is not so limited.

The IOV system provides, generally, that peripheral resources 12 are initialized in the PCIe domain of the MCPU 30 and then exposed or made available across the fabric 20 to the hosts 11 in their respective PCIe domains. The MCPU 30 maintains privileged control over the resources 12 (entire device and global resources) while exposing a subset of control (function level) to the host 11.

Figure 1B:
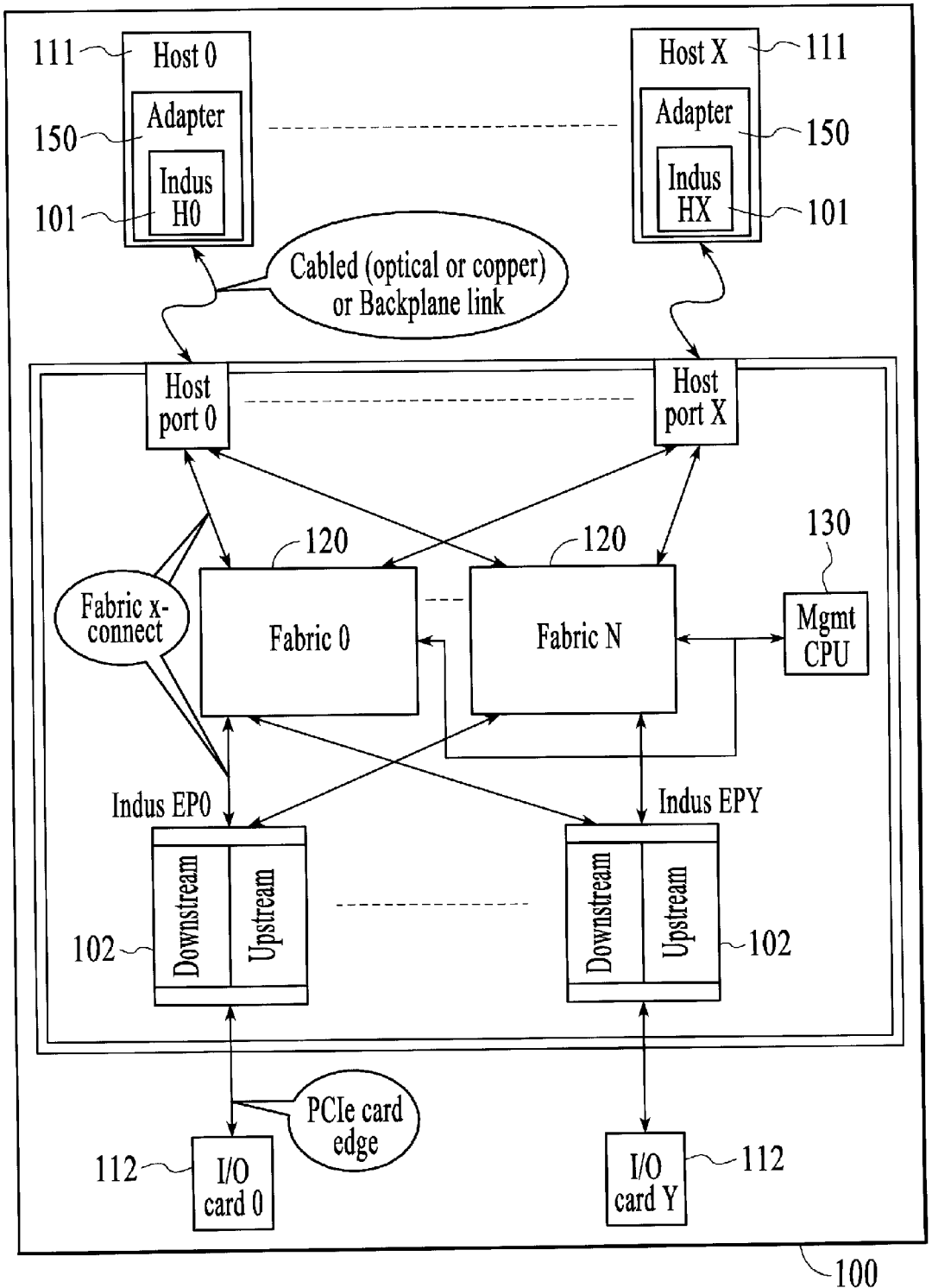
FIG. 1B is another block diagram of the IOV System, under an embodiment.

FIG. 1B is a block diagram of the Input/Output Virtualization (IOV) System 100, under a more specific embodiment. The IOV system 100 comprises a number of IOV interface devices 101-102. The IOV interface devices of an embodiment include host interface devices 101 coupled or connected to host computers 111, where at least one host interface device 101 is coupled or connected to at least one host computer 111 (e.g., Indus H0, Indus H1 . . . Indus HX is coupled or connected to Host 0, Host 1 . . . Host X, respectively (where X is any number)). The IOV interface devices of an embodiment include endpoint interface devices 102 coupled or connected to IO devices 112, where at least one endpoint interface device 102 is coupled or connected to at least one IO device 112 (e.g., Indus EP0, Indus EP1 . . . Indus EPY is coupled or connected to IO device 0, IO device 1 . . . IO device Y, respectively (where Y is any number)).

A transport fabric 120 provides a scalable, low-latency, high-bandwidth interconnection fabric for coupling or connecting the host computers 111, the IO devices 112, and the IOV interface devices 101-102 to the system. Various transport fabric technologies can be used for the transport fabric 120, including Ethernet, InfiniBand, and/or other proprietary fabric solutions to name a few. For ease of use, low cost, and compatibility purposes, the IOV system 100 of an embodiment uses low-latency Ethernet based devices to implement the transport fabric 120. A management CPU 130 of an embodiment couples or connects directly to the transport fabric 120 using a fabric-native interface, and IOV interface functionality between the transport fabric 120 and the management CPU 130 is implemented in software and/or other components of the management CPU 130 and/or the transport fabric 120.

The host interface devices 101 of an embodiment can be a component of an adapter 150, but are not so limited. The adapter 150, when present, may take the physical form of a PCIe card in rackmount servers or mezzanine card in blade servers. The adapter functionality may be further integrated onto a host motherboard. The host interface device 101 provides a standard PCIe interface to the host computer 111, and a multi-link interface to the transport fabric 120.

Figure 2:
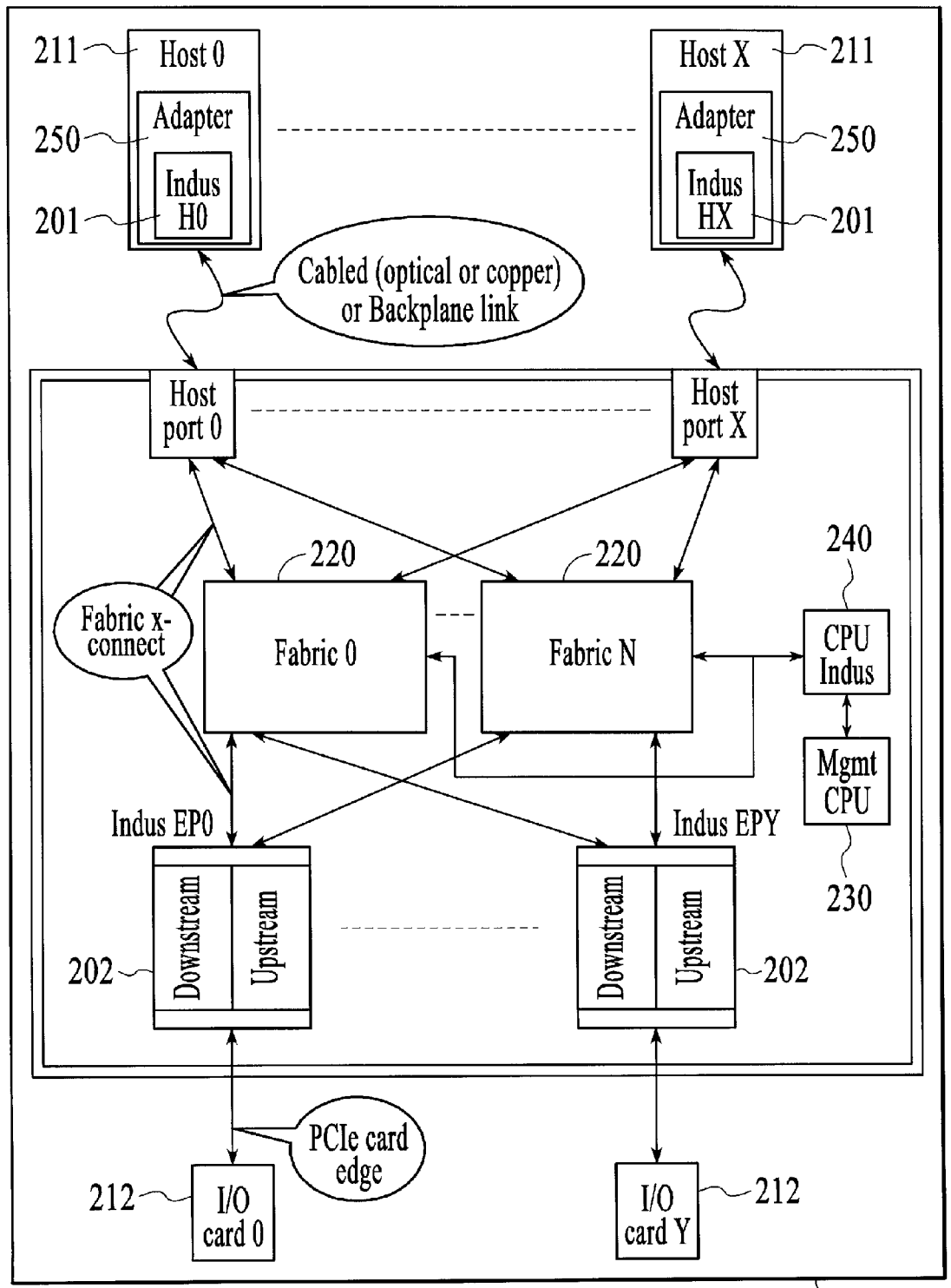
FIG. 2 is a block diagram of the IOV system, under an alternative embodiment.

FIG. 2 is a block diagram of the Input/Output Virtualization (IOV) System 200, under an alternative embodiment. The IOV system 200 comprises a number of IOV interface devices 201-202. The IOV interface devices of an embodiment include a management interface device 240 coupled or connected to a management CPU 230. The IOV interface devices of an embodiment also include host interface devices 201 coupled or connected to host computers 211, where at least one host interface device 201 is coupled or connected to at least one host computer 211 (e.g., Indus H0, Indus H1 . . . Indus HX is coupled or connected to Host 0, Host 1 . . . Host X, respectively (where X is any number)). Furthermore, the IOV interface devices of an embodiment include endpoint interface devices 202 coupled or connected to IO devices 212, where at least one endpoint interface device 202 is coupled or connected to at least one IO device 212 (e.g., Indus EP0, Indus EP1 . . . Indus EPY is coupled or connected to IO device 0, IO device 1 . . . IO device Y, respectively (where Y is any number)).

A transport fabric 220 provides a scalable, low-latency, high-bandwidth interconnection fabric for coupling or connecting the management CPU, the host computers 211, the IO devices 212, and the IOV interface devices 201-202 to the system. Various transport fabric technologies can be used for the transport fabric 220, including Ethernet, InfiniBand, and/or other proprietary fabric solutions to name a few. For ease of use, low cost, and compatibility purposes, the IOV system 200 of an embodiment uses low-latency Ethernet based devices to implement the transport fabric 220.

The host interface devices 201 of an embodiment can be a component of an adapter 250, but are not so limited. The adapter 250, when present, may take the physical form of a PCIe card in rack-mount servers or mezzanine card in blade servers. The adapter functionality may be further integrated onto a host motherboard. The host interface device 201 provides a standard PCIe interface to the host computer 211, and a multi-link interface to the transport fabric 220.

Generally, the host interface device exposes multiple independent PCI devices to the host computer. These PCI devices are exposed as a proxy device, or proxy, of a function within the host interface device. The PCI-Express proxy device is a device which is coupled between a host server's PCI-Express subsystem and a second PCI-Express subsystem (the shared subsystem). The shared subsystem is managed by a PCI-Express manager. The shared subsystem will comprise one or more endpoint devices which provide services such as communications interfaces or storage capacity. The proxy device may implement multiple functions, each of which can be a proxy representing a different endpoint function (EPF) in endpoint devices of the shared subsystem.

The PCI-Express proxy device exposes the functionality of an endpoint function to the host to which the proxy device is accessible. The proxy device appropriately translates all accesses intended for the endpoint into transactions that may be transferred across the switch fabric of the shared subsystem. In this way, the functionality of the endpoint is accessible to the host using standard and existing PCI-Express software.

The proxy provides access to the endpoint device by storing information to identify local and remote resources. As the proxy comprises a PCI function on the local host bus, the local information that it stores includes a PCI identifier in the domain of the local host. The PCI identifier of an embodiment is a bus/device/function (BDF) number. The BDF identifies either the requester or completer in the PCIe split-transaction protocol. The BDF is unique within a single domain, but if a resource is accessed from multiple domains, the BDF is modified so as not to allow duplicate identifiers.

Additionally, the proxy stores information to identify the remote endpoint function. This information includes an EPF identifier, which may be a PCI identifier (e.g., BDF) in the domain of the shared subsystem, or an identifier of a different format. The information to identify the remote EPF also includes the destination address of the device interface corresponding to the EPF, and the destination address of the manager. Furthermore, the information to identify the remote EPF includes resource identifiers such as a memory range identifier (indicating a specific PCI base address register (BAR) in the endpoint device), and a related mechanism to determine the identifier per transaction.

The proxy further handles routing of transactions between the host, the endpoint function, and the MCPU. Depending on the type of endpoint function and the type of transaction, the proxy determines the destination of requests from the host, the destination of requests being either the endpoint function or the MCPU, but the embodiment is not so limited.

In an embodiment, the proxy reserves local resources (e.g., BDF, memory range, I/O range, etc) in the host domain. In so doing, the proxy device provides a placeholder device to reserve resources in the host domain during PCI enumeration and discovery. These resources include a PCI identifier, and the PCI identifier of an embodiment is one or more of a BDF, a memory space reservation, an IO space reservation, an interrupt request identifier, and a PCI capability, to name a few examples. The resources reserved can be a superset of the resources required by any EPF used in the system or, alternatively, a subset of the resources required by any EPF used in the system. Upon assignment of an EPF to a proxy device, the host rescans the PCI-Express subsystem and discovers the EPF resource requests. The resources requested by the EPF fit within the space reserved by the proxy, which prevents extensive reallocation of resources by the host. When the EPF is unassigned from the host, the proxy may be re-programmed to the original state so that resources are reserved during subsequent bus scans.

When a function is assigned to a specific host computer, the proxy for that function is populated with configuration information from the actual function. Upon population of the proxy, the IOV system indicates a hot-plug event to the host computer. Upon recognizing the hot-plug event and discovering the function proxy, the host computer loads the appropriate driver for the function. Configuration accesses to the proxy can be directed to the MCPU which controls configuration of the function and updates the proxy with current configuration status. Depending on the type of endpoint device, the mode of operation of the endpoint device, and the type of transaction, configuration accesses to the proxy may be directed to the EPF itself. The IO accesses to the proxy are sent directly to the IO device via the transport fabric to maintain a low-latency, high-throughput interface.

The IOV host interface device may also include an actual PCIe device to provide a host-to-host communication function. This function allows hosts to communicate directly with other hosts via various methods. Methods may include a memory-oriented scheme and/or a standard sockets-oriented scheme. For example, the mechanism of an embodiment maps a region of IO memory in one host to the physical memory in another. Based on this mechanism, connection-oriented or connectionless communication channels may be implemented. The function includes a direct memory access (DMA) engine, to offload the communication load from host CPUs.

The IO devices or other endpoint devices interface to the IOV system via the standard PCIe interface. The PCIe interface couples or connects to an IOV endpoint interface device (e.g., Indus EPx). The endpoint interface device provides the encapsulation and/or decapsulation of PCIe traffic such that it may traverse the transport fabric between the IO devices, the management CPU and the host computers. The transport fabric coupling or connection generally comprises multiple links to provide high bandwidth.

The IO devices can include devices having any number of different capabilities, single-function devices, multi-function devices, and/or SR-IOV capable devices. SR-IOV indicates a standard developed by the PCI-SIG to allow multifunction devices to be shared amongst multiple guest operating systems on a single host, in a virtual machine monitor (VMM or hypervisor) environment. In the IOV system of an embodiment, single function devices may be assigned to a single host only, with privileged control allowed for that host. Multifunction devices may be shared across multiple hosts with separate physical functions controlled by drivers running on the hosts, while the management CPU may run a privileged driver for configuring the functions. SR-IOV devices may be shared across multiple hosts with the physical functions controlled by the privileged driver running on the management CPU, and the virtual functions assigned to various hosts and controlled by non-privileged drivers running on those hosts.

The transport fabric and IOV interface device logic provide a robust interconnect that guarantees the reliability and quality of service expected by standard PCIe devices. These guarantees include error-free, in-order, exactly-once delivery of packets with relatively low loss under relatively high system load. To achieve this, the transport fabric interface logic closely emulates the functionality of the PCIe link layer. This emulation includes the error checking, ACK/NAK protocol, packet retransmission, quality of service (priority), and extends the link layer with congestion management capabilities.

The use of an Ethernet transport fabric in an embodiment allows for the attachment of many hosts and IO devices. Ethernet switches are denser (more ports) and higher bandwidth than PCIe switches. Therefore, the IOV system can support more ports, on the order of 24-64 ports. This port count can be maintained for even very high bandwidth ports, as described below.

The transport fabric of an embodiment provides high-bandwidth interfaces to host and device ports. PCIe interfaces have a wide range of possible bandwidths, with links comprising one or more lanes, and lanes operating at various speeds. The slowest PCIe link possible is a single lane operating at 2.5 Gb/s (PCIe 1.0×1), for a total link bandwidth of 2.5 Gb/s and a data throughput of 2.0 Gb/s (250 MB/s) after encoding overhead is removed. The fastest link currently available has sixteen lanes operating at 5.0 Gb/s (PCIe 2.0× 16), providing 80 Gb/s of link bandwidth and 64 Gb/s (8 GB/s) of data throughput. As a single fabric port may provide less bandwidth than required to support a fast PCIe link, the IOV interface devices provide the capability to distribute the load across multiple transport fabric links. In order to maintain the maximum port count available in the transport fabric (given by the number of ports on a single fabric switch), multiple fabric switches are used in parallel to support these multi-link interfaces. For example, while a single 24-port fabric switch with 10 Gb/s ports can support 24 10 Gb/s interfaces, a combination of two 24-port switches can support 24 20 Gb/s interfaces. Similarly, a combination of four 64-port switches can support 64 40 Gb/s interfaces. This concept is called 'striping' and, for PCIe fabrics of the IOV system, this concept has been applied to an ethernet fabric. The interfaces may be distributed between hosts, IO devices, and the MCPU.

To support the sharing of peripheral devices or resource devices across multiple domains, the IOV system manages or controls several aspects of communication with the resource device and the fabric and interfaces. The control of the IOV system communication includes managing fabric addresses to enable transport of data between the hosts and allocated resources, and providing domain (address and sender ID) translation between the separate PCIe domains in the system, each of which are described in detail below.

To enable the transport of data between resource functions and hosts, each resource function and a representation of each function in the host interface is uniquely addressable over the transport fabric of an embodiment. Therefore, each interface device (host and resource) has a MAC address, and each function representation (proxy) also has a MAC address. The individual functions in a resource are disambiguated in a transport packet header field. Generally, then, functions of a target endpoint device are presented to a controlling server through an associated proxy device. Servers, proxy devices and endpoint devices use PCI Express transaction protocol to communicate. A proxy configuration manager copies the configuration space of a target endpoint device to a proxy device associated with a controlling server. The present invention further provides a proxy interrupt conveyance mechanism that relays pending interrupts from endpoint devices in the shared subsystem to the appropriate controlling servers.

For example, sharing of endpoint devices is accomplished in an embodiment by introducing proxy devices and a proxy configuration manager component that copies the configuration space of a target endpoint device to associated proxy devices. A controlling server may be coupled to a proxy device. In one embodiment, the proxy device has at least two ports: a first port that is coupled to the controlling server and a second port that is coupled to a PCIe fabric. The host port comprises a PCIe link that may be scalable and comprise one or more high-speed lanes in accordance with the PCI-Express physical specification. In one embodiment, the proxy device comprises a copy of the configuration space of a target endpoint device. The controlling server accesses a function of the target endpoint device through the associated proxy device, which instantiates the target function by proxy. The configuration space of the proxy device may comprise the PCI configuration registers, power management capabilities, message signaled interrupt (MSI) and/or MSI-eXtended (MSI-X) capabilities, and PCIe extended capabilities. The proxy device may be capable of receiving interrupt transactions from a proxy interrupt conveyance mechanism and communicating the interrupt transactions to a controlling server over a PCIe link. The proxy device may expose multiple functions embedded within endpoint devices to the server side of the IOV system and instantiate them by proxy. Each of these functions can represent a different endpoint function in the shared subsystem.

Figure 3:
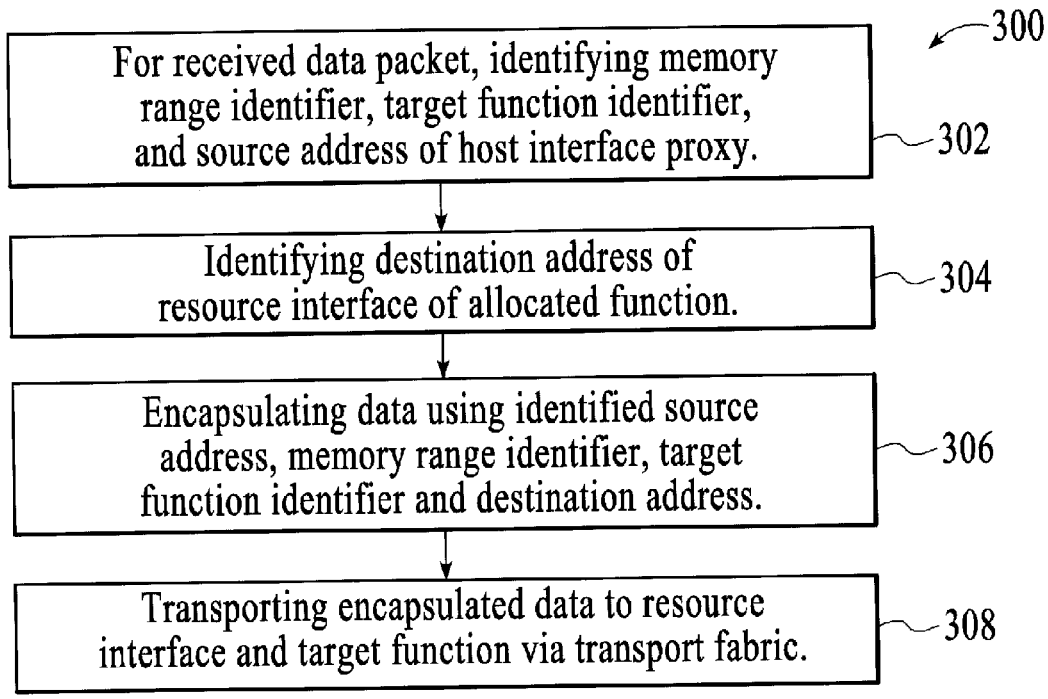
FIG. 3 is a flow diagram for fabric addressing, under an embodiment.

The MCPU handles resource allocation and, as such, handles the programming of addresses in the fabric interfaces. In the IOV system of an embodiment, the transport fabric is based on Ethernet technology and the addresses used are MAC addresses. FIG. 3 is a flow diagram for fabric addressing 300, under an embodiment. When a PCIe data packet intended for a resource function enters a host interface on the host link, a memory range identifier, a target function identifier, and the source address of the host interface proxy are located or identified 302. The destination address of the resource interface of the allocated function is also located or identified 304. The identified source address, memory range identifier, target function identifier and destination address are used to encapsulate the data 306. The encapsulated data is transported 308 to the resource interface and the target function via the transport fabric.

Figure 4:
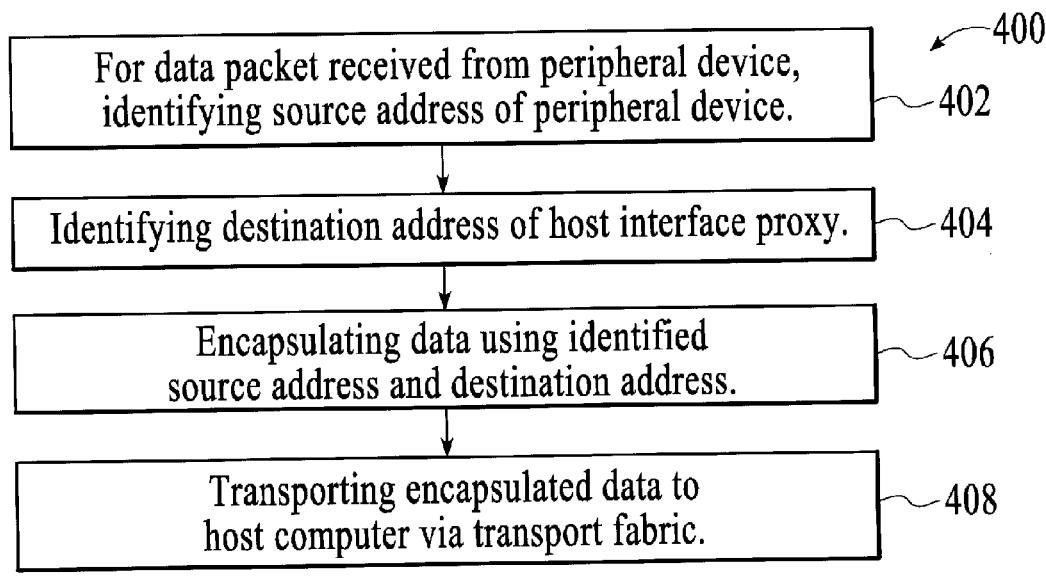
FIG. 4 is a flow diagram for fabric addressing, under an alternative embodiment.

FIG. 4 is a flow diagram for fabric addressing 400, under an alternative embodiment. When a PCIe data packet intended for a host enters a device interface from a peripheral device, the source address of the peripheral device is located or identified 402. The destination address of the host interface proxy is also located or identified 404. The identified source address and destination address are used to encapsulate the data 406, and the encapsulated data is transported 408 to the host computer via the transport fabric.

While examples of two specific data flows have been provided, other flows including memory transactions, device transactions, messages, and configuration flows are handled by the system interfaces and fabric.

Additionally, the MCPU interface is addressable from the fabric. For entry into the system, host and device interfaces send messages to the MCPU. Similarly, for error cases, such as for packets in which the destination lookup fails, these packets are forwarded to the MCPU.

In providing domain translation, two types of parameter are translated in order to enable PCIe devices to be accessed from multiple domains. These parameters include, but are not limited to, the PCIe sender ID (SID), and memory addresses, each of which is described in detail below.

When a device is discovered and enumerated per the PCI-SIG-defined standard methods within a computer's PCIe domain, it is assigned a sender ID (SID), which includes a bus, a device, and a function number (BDF). The BDF identifies either the requester or completer in the PCIe split-transaction protocol. The BDF is unique within a single domain, but if a resource is accessed from multiple domains, the BDF is modified so as not to allow duplicate identifiers.

Figure 5:
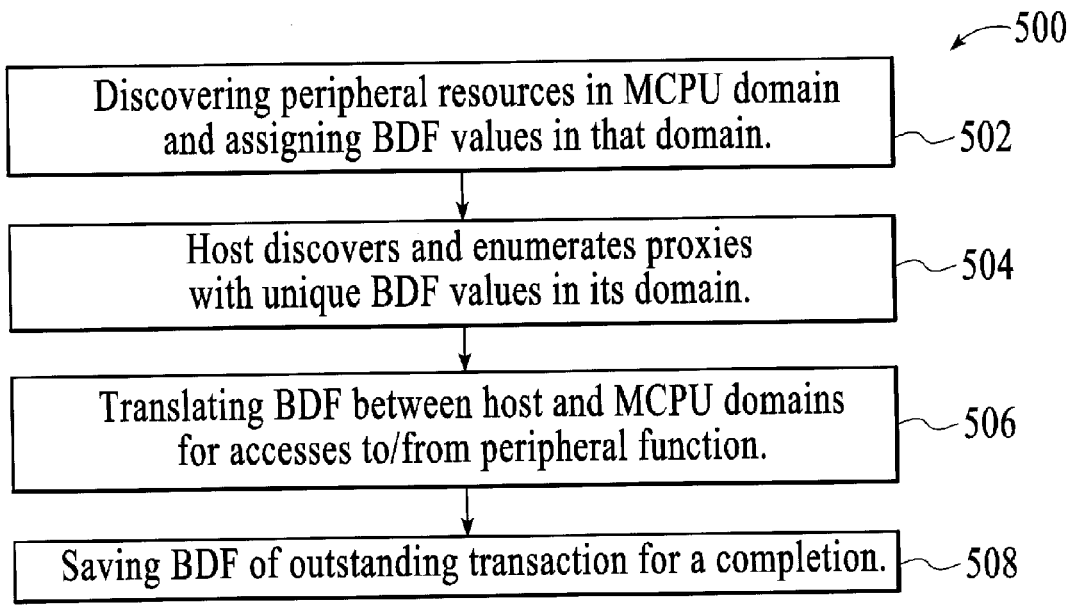
FIG. 5 is a flow diagram for sender identification translation, under an embodiment.

FIG. 5 is a flow diagram for sender identification translation 500, under an embodiment. Peripheral resources in the IOV system are discovered and enumerated in the MCPU domain and are assigned BDF values in that domain 502. The host discovers and enumerates proxy devices with unique BDF values in its domain 504. Accesses to/from the peripheral function undergo BDF translation between the host and MCPU domains 506, and the BDF of an outstanding transaction is saved for a completion 508. The translation may be executed in the host interface or device interface logic.

The other aspect of domain translation in the IOV system of an embodiment is memory address translation. Similarly to BDF enumeration, each resource function is assigned memory ranges by system software for use in the MCPU domain. Each function proxy is assigned memory ranges in its host domain, which can be different from the range in the MCPU domain. For PCIe packets that are routed via memory address, the address is translated between the domains.

Figure 6:
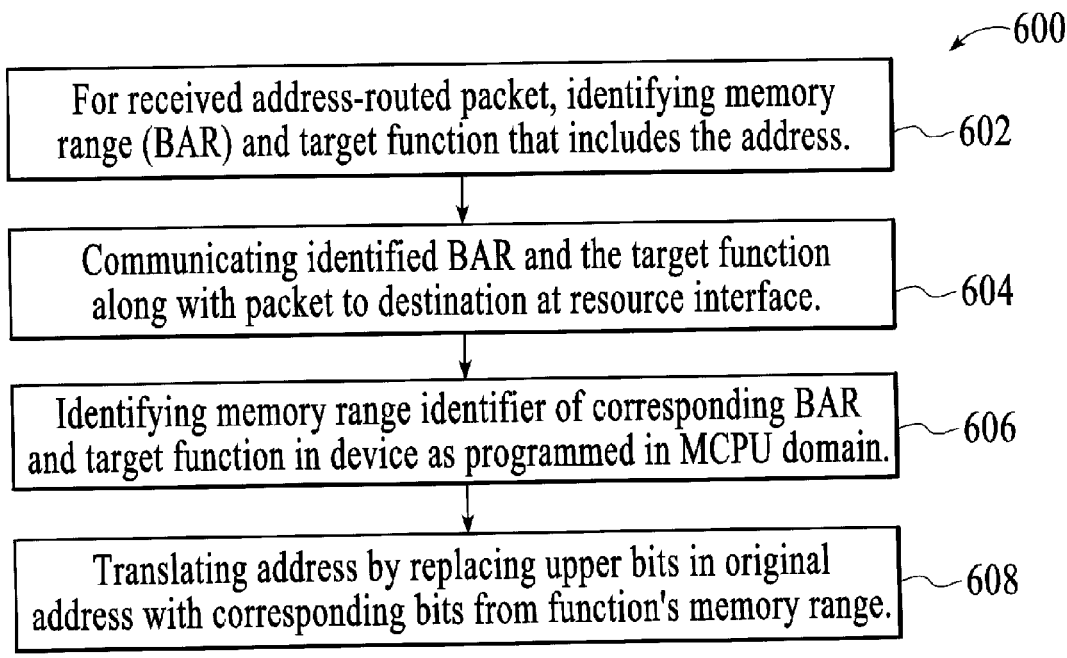
FIG. 6 is a flow diagram for memory address translation, under an embodiment.

FIG. 6 is a flow diagram for memory address translation 600, under an embodiment. Using PCIe, the memory ranges are determined by a set of registers referred to as base address registers (BARs). When an address-routed packet enters the host interface of the IOV system, the memory range (BAR) and target function that include the address is identified 602. The identified BAR and target function are communicated along with the packet to its destination at the resource interface 604. At the resource interface, the memory range identifier is used to identify the corresponding range (BAR) and function as programmed in the MCPU domain 606. The interface device can then translate the address by replacing the upper bits in the original address with the corresponding bits from the function's memory range 608.

Figure 7:
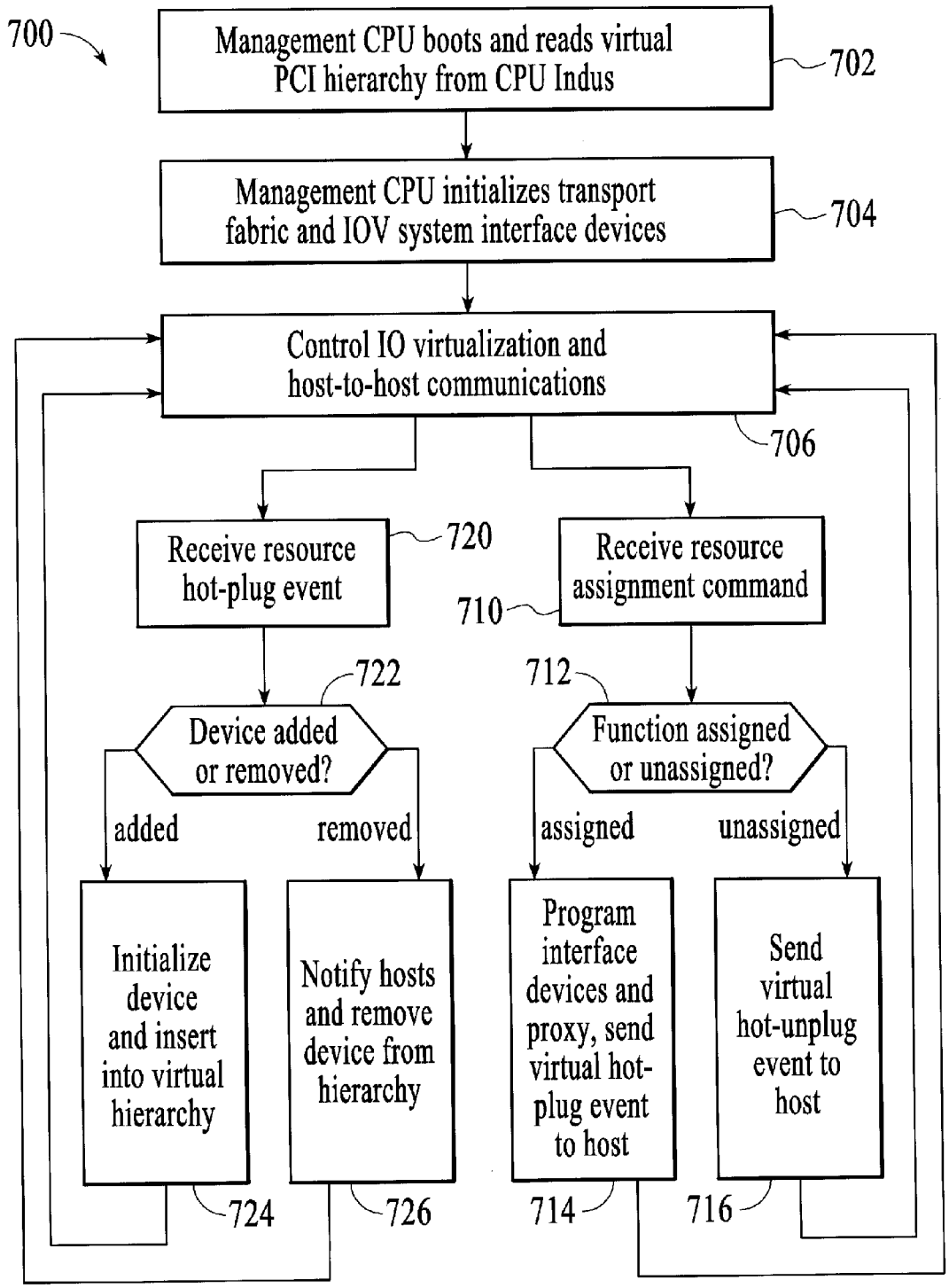
FIG. 7 is a flow diagram for controlling communications between host computers and I/O devices, under an embodiment.

FIG. 7 is a flow diagram for controlling 300 communications between host computers and IO devices, under an embodiment. Upon system startup, the management CPU boots 302 and loads a virtual PCIe hierarchy from the management interface device, then initializes 304 the transport fabric and IOV system interface devices coupled or connected to the system. The IOV interface devices provide an encapsulation and/or decapsulation protocol for PCIe traffic to traverse the transport fabric, as described above.

Using the transport fabric to access the IO devices, the management CPU then uses the standard PCIe discovery process to discover and enumerate all of the PCIe resources coupled or connected to the system. Generally, all resource discovery can be treated as hot-plug (e.g., at startup, devices already connected will send hot-plug events). When a resource is hot-plugged into the system, it is inserted into the virtual hierarchy and initialized. The management CPU initializes the PCIe devices, and runs a privileged driver for each to control the PCIe device. The privileged driver has complete control over the physical PCIe device, including power management and reset capability. The management CPU similarly discovers and controls PCIe devices that are hot-plugged to the system during live operation. The IOV system once initialized couples or connects multiple host computers and multiple IO devices to a managed transport fabric to provide and control 306 IO virtualization and host-to-host communication services to the host computers.

More specifically, communication control operations of an embodiment continue with the IOV system providing and controlling 306 IO virtualization and host-to-host communication services to the host computers using resource assignment commands and resource hot-plug events. In an embodiment, a resource assignment command is received 310, and a determination is made 312 whether the corresponding function is assigned or unassigned. When the function is assigned, associated interface devices and proxies are programmed and a virtual hot-plug event is sent 314 to the host. When the function is unassigned, a virtual hot-unplug event is sent 316 to the host.

Operation continues in an embodiment when a resource hot-plug event is received 320. In response, a determination is made 322 whether a device is being added or removed. When a device is being added, the device is initialized and inserted 324 into the virtual hierarchy. When a device is being removed, the host is notified and the device is removed 326 from the virtual hierarchy.

The IOV system of an embodiment allows for virtualization of multifunction (non-MR aware) PCIe devices across multiple hosts while utilizing the native device drivers. The IOV system further allows native host to host communications across the interconnect fabric, along with the IOV traffic. Additionally, the system provides native PCIe interfaces to hosts and IO devices in a scalable fashion (many high-bandwidth ports).

The IOV system implements a flexible and efficient architecture for datacenter computer interconnects. The IOV system architecture, for example, provides access to multiple IO resources over a single host connection which replaces multiple independent dedicated network connections. The convergence of these connections over a single 'wire' reduces costs and cabling complexity in the datacenter.

The ability to provision IO resources at a fine level of granularity using the IOV system gives users an efficient way to assign the resources that are necessary for a given compute job. Resources may be allocated according to service level agreements or allocated at the time of use. This prevents the need to install IO resources that may be underutilized by a given host.

The ability to centralize IO resources allows for efficient high-availability configurations. For example, if the host controlling a given resource fails, the resource can be reassigned to a working host and use of the resource can resume.

The IO address virtualization provided by the IOV system allows server hardware to be added or changed without affecting network configuration settings for access to other hosts, access to storage devices, and security. This simplifies network maintenance as servers are added, removed, or upgraded.

Conventional PCIe based systems are limited in scalability, and systems connected through standard PCIe switch silicon are severely limited in port count, limiting the number of hosts and IO devices that may be connected to the system. The IOV system provides a standard, scalable transport fabric and therefore a scalable and flexible interconnection topology for many hosts and IO devices. This also allows the IOV system of an embodiment to leverage existing standards-based devices and the original drivers provided by the device vendors.

The IOV system provides for a centralized entity to manage the assignment of IO functions to hosts and host-to-host communication channels. This capability allows datacenter managers to control the amount of IO allocated to individual hosts, ensuring that datacenter resources are available when desired and are used efficiently. The IOV system also provides a high-bandwidth, low-latency host-to-host communication capability. Providing this capability at the first tier (closest to the host) of interconnection is critical to achieving low latency and high throughput, while integration at this level reduces the cost of implementation.

The IOV system allows host (server) computers to be procured and installed without specific IO resources, and can access the necessary IO resources from the IOV network. Similarly, IO resources can be procured as necessary and installed in the system independently of computer resources (CPU and Memory). Thus, the upgrade cycles for compute and IO resources can be separated, reducing procurement cost and complexity.

Embodiments described herein comprise a system including a management central processor unit (MCPU) coupled to transport fabric. The system of an embodiment comprises a plurality of device interfaces coupled to the transport fabric and to a plurality of independent input/output (IO) devices. The plurality of independent IO devices is initialized in an MCPU domain. The system of an embodiment comprises a plurality of host interfaces coupled to the transport fabric. Each host interface couples to a host computer of a plurality of independent host computers and exposes functions of the plurality of independent IO devices to the host computer. Each host computer of the plurality of independent host computers accesses the functions from a host domain that is an independent domain specific to the host computer performing the access. The MCPU domain is different from the host domain.

Embodiments described herein comprise a system comprising: a management central processor unit (MCPU) coupled to transport fabric; a plurality of device interfaces coupled to the transport fabric and to a plurality of independent input/output (IO) devices, the plurality of independent IO devices initialized in an MCPU domain; and a plurality of host interfaces coupled to the transport fabric, wherein each host interface couples to a host computer of a plurality of independent host computers and exposes functions of the plurality of independent IO devices to the host computer, each host computer of the plurality of independent host computers accessing the functions from a host domain that is an independent domain specific to the host computer performing the access, wherein the MCPU domain is different from the host domain.

The plurality of independent IO devices of an embodiment comprises a plurality of endpoint functions (EPFs) shared across the plurality of independent host computers.

The MCPU of an embodiment controls transfer of data between the plurality of independent host computers and the plurality of independent IO devices by managing source addresses of a host interface proxy of each host interface and destination addresses of each EPF of each IO device.

The system of an embodiment comprises receiving a data packet at a host interface, the data packet including a data payload.

The system of an embodiment comprises identifying a source address of the host interface proxy of the host interface.

The system of an embodiment comprises identifying a destination address of a device interface corresponding to an EPF to which the data packet will be routed.

The destination address of the device interface of an embodiment is an Ethernet destination address.

The system of an embodiment comprises identifying an EPF identifier corresponding to the EPF.

The system of an embodiment comprises generating a data capsule by adding a header to the data payload of the data packet, the header comprising the EPF identifier.

The system of an embodiment comprises, using a combination of the destination address and the header, transferring the data capsule to the EPF.

The system of an embodiment comprises, using the destination address, transferring the data capsule to the device interface via the transport fabric.

The system of an embodiment comprises, using the header, transferring the data capsule to the EPF.

The MCPU of an embodiment controls transfer of data between the plurality of independent host computers and the plurality of independent IO devices by managing source addresses of an EPF of each IO device and destination addresses of a host interface proxy of each host interface.

The system of an embodiment comprises receiving a data packet at a device interface of an IO device that includes an EPF, the data packet including a data payload, wherein the data is addressed to a host computer.

The system of an embodiment comprises identifying a source address of the device interface corresponding to the EPF.

The system of an embodiment comprises identifying a destination address of a host interface corresponding to a host interface proxy of a host computer to which the data packet will be routed.

The destination address of the host interface of an embodiment is an Ethernet destination address.

The system of an embodiment comprises identifying a proxy identifier corresponding to the host interface proxy.

The system of an embodiment comprises generating a data capsule by adding a header to the data payload of the data packet, the header comprising the proxy identifier.

The system of an embodiment comprises, using a combination of the destination address and the header, transferring the data capsule to the host computer.

The system of an embodiment comprises, using the destination address, transferring the data capsule to the host interface via the transport fabric.

The system of an embodiment comprises, using the header, transferring the data capsule to the host interface proxy.

Each host interface of an embodiment comprises a proxy corresponding to each EPF reserved for use by a corresponding host computer corresponding to the host interface.

The system of an embodiment comprises translating parameters between the MCPU domain and the host domain.

The parameter of an embodiment is a sender identification.

The MCPU of an embodiment discovers and enumerates the plurality of independent IO devices in the MCPU domain.

The system of an embodiment comprises assigning to each EPF of the plurality of EPFs a first bus-device-function (BDF) number in the MCPU domain, wherein the first BDF number is unique to the MCPU domain.

The corresponding host computer of an embodiment discovers and enumerates the proxy in the host domain using a second BDF number, wherein the second BDF number is unique to the host domain and is different than the first BDF number.

The system of an embodiment comprises translating the BDF number between the MCPU domain and the host domain during accesses to and from the EPF.

The system of an embodiment comprises translating the BDF number in the host interface.

The system of an embodiment comprises translating the BDF number in the device interface.

The system of an embodiment comprises translating the BDF number of the MCPU domain to a BDF number of the host domain during accesses to the EPF.

The system of an embodiment comprises translating the BDF number of the host domain to a BDF number of the MCPU domain during accesses from the EPF.

The parameter of an embodiment is a memory address.

The system of an embodiment comprises assigning to each EPF of the plurality of EPFs a first memory range in the MCPU domain, wherein the first memory range is unique to the MCPU domain.

The system of an embodiment comprises assigning to each proxy a second memory range in the host domain, wherein the second memory range is unique to the host domain.

The system of an embodiment comprises determining a memory range identifier that identifies the second memory range corresponding to a packet received at a proxy of a receiving host interface, wherein the packet is an address-routed packet.

The system of an embodiment comprises transferring the memory range identifier to a destination EPF along with the packet.

The system of an embodiment comprises, using the memory range identifier, identifying the first memory range in the MCPU domain that corresponds to the second memory range.

The system of an embodiment comprises translating the second memory range to the first memory range.

The translating of an embodiment comprises replacing a plurality of upper bits in the second memory range with corresponding bits from the first memory range.

The first memory range and the second memory range of an embodiment are determined by base address registers.

The MCPU domain of an embodiment is a Peripheral Component Interconnect Express (PCIe) domain of the MCPU.

The host domain of an embodiment is a Peripheral Component Interconnect Express (PCIe) domain of at least one of the plurality of independent host computers.

The device interfaces and the host interfaces of an embodiment comprise at least one of an encapsulation protocol and a decapsulation protocol for Peripheral Component Interconnect Express (PCIe) traffic to traverse the transport fabric.

The MCPU of an embodiment discovers and initializes the plurality of independent IO devices.

The MCPU of an embodiment runs a privileged driver for each IO device of the plurality of independent IO devices, wherein the privileged driver controls the IO device.

The plurality of independent IO devices of an embodiment include an IO device with one endpoint function (EPF), wherein the MCPU assigns the IO device with one EPF to a single host computer, wherein the single host computer has privileged control over the EPF.

The plurality of independent IO devices of an embodiment include an IO device with a plurality of endpoint functions (EPFs), wherein the IO device with the plurality of EPFs is shared across a set of host computers of the plurality of independent host computers.

Each host interface of an embodiment comprises a proxy including configuration data.

The configuration data of an embodiment comprises a bus-device-function (BDF) number in the host domain.

The configuration data of an embodiment comprises a memory range identifier.

The configuration data of an embodiment comprises an endpoint function (EPF) identifier of an EPF of at least one IO device reserved for use by the corresponding host computer.

The configuration data of an embodiment comprises a destination address of a device interface corresponding to an endpoint function (EPF) of at least one IO device reserved for use by the corresponding host computer.

Configuration accesses to the proxy of an embodiment are directed to the MCPU, wherein the MCPU controls configuration of the EPFs and updates the host computer with current configuration status.

The plurality of independent IO devices of an embodiment is coupled to the transport fabric using a Peripheral Component Interconnect Express (PCIe) interface.

Embodiments described herein include a system comprising a plurality of device interfaces coupled to transport fabric and to a plurality of independent input/output (IO) devices that are initialized in a first domain. The system of an embodiment comprises a plurality of host interfaces coupled to the transport fabric. Each host interface couples to a host computer of a plurality of independent host computers and exposes functions of the plurality of independent IO devices to the host computer. Each host computer of the plurality of independent host computers accesses the functions from a host domain that is an independent domain specific to the host computer performing the access. The first domain is different from the host domain.

Embodiments described herein include a system comprising: a plurality of device interfaces coupled to transport fabric and to a plurality of independent input/output (IO) devices that are initialized in a first domain; and a plurality of host interfaces coupled to the transport fabric, wherein each host interface couples to a host computer of a plurality of independent host computers and exposes functions of the plurality of independent IO devices to the host computer, each host computer of the plurality of independent host computers accessing the functions from a host domain that is an independent domain specific to the host computer performing the access, wherein the first domain is different from the host domain.

Embodiments described herein include a method comprising coupling a plurality of device interfaces to the transport fabric and to a plurality of independent input/output (IO) devices that are initialized in a first domain. The method of an embodiment comprises coupling a plurality of host interfaces to the transport fabric by coupling each host interface to a host computer of a plurality of independent host computers. The method of an embodiment comprises exposing functions of the plurality of independent IO devices to the host computer. The exposing comprises each host computer of the plurality of independent host computers accessing the functions from a host domain that is an independent domain specific to the host computer performing the access. The first domain is different from the host domain.

Embodiments described herein include a method comprising: coupling a plurality of device interfaces to the transport fabric and to a plurality of independent input/output (IO) devices that are initialized in a first domain; coupling a plurality of host interfaces to the transport fabric by coupling each host interface to a host computer of a plurality of independent host computers; and exposing functions of the plurality of independent IO devices to the host computer, wherein the exposing comprises each host computer of the plurality of independent host computers accessing the functions from a host domain that is an independent domain specific to the host computer performing the access, wherein the first domain is different from the host domain.

The method of an embodiment comprises sharing a plurality of endpoint functions (EPFs) of the plurality of independent IO devices across the plurality of independent host computers.

The method of an embodiment comprises controlling transfer of data between the plurality of independent host computers and the plurality of independent IO devices by managing source addresses of a host interface proxy of each host interface and destination addresses of each EPF of each IO device.

The method of an embodiment comprises receiving a data packet at a host interface, the data packet including a data payload.

The method of an embodiment comprises identifying a source address of the host interface proxy of the host interface.

The method of an embodiment comprises identifying a destination address of a device interface corresponding to an EPF to which the data packet will be routed.

The destination address of the device interface of an embodiment is an Ethernet destination address.

The method of an embodiment comprises identifying an EPF identifier corresponding to the EPF.

The method of an embodiment comprises generating a data capsule by adding a header to the data payload of the data packet, the header comprising the EPF identifier.

The method of an embodiment comprises, using a combination of the destination address and the header, transferring the data capsule to the EPF.

The method of an embodiment comprises, using the destination address, transferring the data capsule to the device interface via the transport fabric.

The method of an embodiment comprises, using the header, transferring the data capsule to the EPF.

The method of an embodiment comprises controlling transfer of data between the plurality of independent host computers and the plurality of independent IO devices by managing source addresses of an EPF of each IO device and destination addresses of a host interface proxy of each host interface.

The method of an embodiment comprises receiving a data packet at a device interface of an IO device that includes an EPF, the data packet including a data payload, wherein the data is addressed to a host computer.

The method of an embodiment comprises identifying a source address of the device interface corresponding to the EPF.

The method of an embodiment comprises identifying a destination address of a host interface corresponding to a host interface proxy of a host computer to which the data packet will be routed.

The destination address of the host interface of an embodiment is an Ethernet destination address.

The method of an embodiment comprises identifying a proxy identifier corresponding to the host interface proxy.

The method of an embodiment comprises generating a data capsule by adding a header to the data payload of the data packet, the header comprising the proxy identifier.

The method of an embodiment comprises, using a combination of the destination address and the header, transferring the data capsule to the host computer.

The method of an embodiment comprises, using the destination address, transferring the data capsule to the host interface.

The method of an embodiment comprises, using the header, transferring the data capsule to the host interface proxy.

Each host interface of an embodiment comprises a proxy corresponding to each EPF reserved for use by a corresponding host computer corresponding to the host interface.

The method of an embodiment comprises translating parameters between the first domain and the host domain.

The parameter of an embodiment is a sender identification.

The method of an embodiment comprises discovering and enumerating the plurality of independent IO devices in the first domain.

The method of an embodiment comprises assigning to each EPF of the plurality of EPFs a first bus-device-function (BDF) number in the first domain, wherein the first BDF number is unique to the first domain.

The corresponding host computer of an embodiment discovers and enumerates the proxy in the host domain using a second BDF number, wherein the second BDF number is unique to the host domain and is different than the first BDF number.

The method of an embodiment comprises translating the BDF number between the first domain and the host domain during accesses to and from the EPF.

The method of an embodiment comprises translating the BDF number in the host interface.

The method of an embodiment comprises translating the BDF number in the device interface.

The method of an embodiment comprises translating the BDF number of the first domain to a BDF number of the host domain during accesses to the EPF.

The method of an embodiment comprises translating the BDF number of the host domain to a BDF number of the first domain during accesses from the EPF.

The parameter of an embodiment is a memory address.

The method of an embodiment comprises assigning to each EPF of the plurality of EPFs a first memory range in the first domain, wherein the first memory range is unique to the first domain.

The method of an embodiment comprises assigning to each proxy a second memory range in the host domain, wherein the second memory range is unique to the host domain.

The method of an embodiment comprises determining a memory range identifier that identifies the second memory range corresponding to a packet received at a proxy of a receiving host interface, wherein the packet is an address-routed packet.

The method of an embodiment comprises transferring the memory range identifier to a destination EPF along with the packet.

The method of an embodiment comprises, using the memory range identifier, identifying the first memory range in the first domain that corresponds to the second memory range.

The method of an embodiment comprises translating the second memory range to the first memory range.

The translating of an embodiment comprises replacing a plurality of upper bits in the second memory range with corresponding bits from the first memory range.

The first memory range and the second memory range of an embodiment are determined by base address registers.

The first domain of an embodiment is a Peripheral Component Interconnect Express (PCIe) domain.

The host domain of an embodiment is a Peripheral Component Interconnect Express (PCIe) domain of at least one of the plurality of independent host computers.

The device interfaces and the host interfaces of an embodiment comprise at least one of an encapsulation protocol and a decapsulation protocol for Peripheral Component Interconnect Express (PCIe) traffic.

The method of an embodiment comprises discovering and initializing the plurality of independent IO devices.

The method of an embodiment comprises running a privileged driver for each IO device of the plurality of independent IO devices, wherein the privileged driver controls the IO device.

The plurality of independent IO devices of an embodiment include an IO device with one endpoint function (EPF), comprising assigning the IO device with one EPF to a single host computer, wherein the single host computer has privileged control over the EPF.

The plurality of independent IO devices of an embodiment include an IO device with a plurality of endpoint functions (EPFs), wherein the IO device with the plurality of EPFs is shared across a set of host computers of the plurality of independent host computers.

Each host interface of an embodiment comprises a proxy including configuration data.

The configuration data of an embodiment comprises a bus-device-function (BDF) number in the host domain.

The configuration data of an embodiment comprises a memory range identifier.

The configuration data of an embodiment comprises an endpoint function (EPF) identifier of an EPF of at least one IO device reserved for use by the corresponding host computer.

The configuration data of an embodiment comprises a destination address of a device interface corresponding to an endpoint function (EPF) of at least one IO device reserved for use by the corresponding host computer.

The method of an embodiment comprises controlling configuration of the EPFs and updating the host computer with current configuration status.

Networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof. Storage resources accessed by the system comprise storage networks (e.g., SAN, NAS, etc.), direct attached disks (e.g., DAS), and can also include removable media (e.g., CD, DVD, Tape, Flash, etc).

The IOV system can be a component of a single system, multiple systems, and/or geographically separate systems. The IOV system can also be a subcomponent or subsystem of a single system, multiple systems, and/or geographically separate systems. The IOV system can be coupled to one or more other components (not shown) of a host system or a system coupled to the host system.

One or more components of the IOV system and/or a corresponding system or application to which the IOV system is coupled or connected include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the IOV system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the IOV system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the IOV system and corresponding systems and methods include: microcontrollers with memory (such as electronically erasable programmable read only memory (EEPROM)), embedded microprocessors, firmware, software, etc. Furthermore, aspects of the IOV system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the IOV system and corresponding systems and methods is not intended to be exhaustive or to limit the systems and methods to the precise forms disclosed. While specific embodiments of, and examples for, the IOV system and corresponding systems and methods are described herein for illustrative purposes, various equivalent modifications are possible within the scope of the systems and methods, as those skilled in the relevant art will recognize. The teachings of the IOV system and corresponding systems and methods provided herein can be applied to other systems and methods, not only for the systems and methods described above.

The elements and acts of the various embodiments described above can be combined to provide further embodiments. These and other changes can be made to the IOV system and corresponding systems and methods in light of the above detailed description.

In general, in the following claims, the terms used should not be construed to limit the IOV system and corresponding systems and methods to the specific embodiments disclosed in the specification and the claims, but should be construed to include all systems that operate under the claims. Accordingly, the IOV system and corresponding systems and methods is not limited by the disclosure, but instead the scope is to be determined entirely by the claims.

While certain aspects of the IOV system and corresponding systems and methods are presented below in certain claim forms, the inventors contemplate the various aspects of the IOV system and corresponding systems and methods in any number of claim forms. Accordingly, the inventors reserve the right to add additional claims after filing the application to pursue such additional claim forms for other aspects of the IOV system and corresponding systems and methods.

What is claimed is:

1. A system comprising:
a management central processor unit (MCPU) coupled to a transport fabric, the MCPU configured to initialize the transport fabric;
a plurality of device interfaces coupled to the transport fabric and to a plurality of independent input/output (IO) devices; and
a plurality of host interfaces coupled to the transport fabric, wherein each host interface couples to a corresponding host computer of a plurality of independent host computers and comprises a proxy device configured to expose an assigned endpoint function corresponding to a particular IO device of the plurality of independent IO devices to the corresponding host computer, the proxy device further configured to receive and encapsulate data packets from the corresponding host computer that are intended for the assigned endpoint function and thereby route the data packets to the particular IO device.

2. The system of claim 1, wherein the plurality of independent IO devices comprise a plurality of endpoint functions (EPFs) shared across the plurality of independent host computers.

3. The system of claim 2, the MCPU configured to control the transfer of data between the plurality of independent host computers and the plurality of independent IO devices by managing source addresses of a host interface proxy of each host interface and destination addresses of each EPF of each IO device.

4. The system of claim 3, wherein the proxy device is further configured to receive a host data packet, the host data packet including a data payload.

5. The system of claim 4, wherein the proxy device is further configured to associate a source address of the proxy device with the host data packet.

6. The system of claim 5, wherein the proxy device is further configured to associate a destination address of a device interface for the particular IO device with the host data packet.

7. The system of claim 6, wherein the destination address of the device interface is an Ethernet destination address.

8. The system of claim 6, wherein the proxy device is further configured to associate an EPF identifier corresponding to the assigned endpoint function with the host data packet.

9. The system of claim 8, wherein the proxy device is further configured to generate a data capsule by adding a header to the data payload of the host data packet, the header comprising the EPF identifier.

10. The system of claim 9, wherein the proxy device is further configured to, using a combination of the destination address and the header, transfer the data capsule to the assigned endpoint function.

11. The system of claim 9, wherein the proxy device is further configured to, using the destination address, transfer the data capsule to the device interface via the transport fabric.

12. The system of claim 9, wherein the transport fabric is configured to, using the header, transfer the data capsule to the assigned endpoint function.

13. The system of claim 2, wherein the MCPU is further configured to control the transfer of data between the plurality of independent host computers and the plurality of independent IO devices by managing source addresses of an EPF of each IO device and destination addresses of a host interface proxy of each host interface.

14. The system of claim 13, wherein the device interface is further configured to receive a device data packet addressed to a host computer.

15. The system of claim 14, wherein the device interface is further configured to associate a source address of the device interface with the device data packet.

16. The system of claim 15, wherein the device interface is further configured to associate a destination address of a host interface corresponding to a host computer to which the device data packet will be routed.

17. The system of claim 16, wherein the destination address of the host interface is an Ethernet destination address.

18. The system of claim 17, wherein the device interface is further configured to generate a data capsule by adding a header to the data payload of the device data packet.

19. The system of claim 18, wherein the device interface is further configured to, using a combination of the destination address and the header, transfer the data capsule to the host computer.

20. The system of claim 18, wherein the transport fabric is further configured to, using the destination address, transfer the data capsule to the host interface via the transport fabric.

21. The system of claim 18, wherein the transport fabric is further configured to, using the header, transfer the data capsule to the host interface.

22. The system of claim 2, each host interface comprising a device proxy corresponding to each EPF reserved for use by a corresponding host computer corresponding to the host interface.

23. The system of claim 22, wherein the device proxy is configured to translate parameters between the MCPU domain and the host domain.

24. The system of claim 23, wherein the parameter is a sender identification.

25. The system of claim 24, wherein the MCPU is configured to discover and enumerate the plurality of independent IO devices in the MCPU domain.

26. The system of claim 25, wherein the MCPU is further configured to assign to each EPF of the plurality of EPFs a first bus-device-function (BDF) number in the MCPU domain, wherein the first BDF number is unique to the MCPU domain.

27. The system of claim 26, wherein the corresponding host computer is configured to discover and enumerate the device proxy in the host domain using a second BDF number, wherein the second BDF number is unique to the host domain and is different than the first BDF number.

28. The system of claim 27, wherein the device proxy is configured to translate the BDF number between the MCPU domain and the host domain during accesses to and from the EPF.

29. The system of claim 28, wherein the device interface is configured to translate the BDF number between the MCPU domain and the host domain during accesses to and from the EPF.

30. The system of claim 23, wherein the parameter is a memory address.

31. The system of claim 30, wherein the MCPU is further configured to assign to each EPF of the plurality of EPFs a first memory range in the MCPU domain, wherein the first memory range is unique to the MCPU domain.

32. The system of claim 31, wherein the MCPU is further configured to assign to the device proxy a second memory range in the host domain, wherein the second memory range is unique to the host domain.

33. The system of claim 32, wherein the device proxy is configured to determine a memory range identifier that identifies the second memory range corresponding to a device packet received at the device proxy, wherein the device packet is an address-routed packet.

34. The system of claim 33, wherein the device proxy is further configured to translate the second memory range to the first memory range.

35. The system of claim 34, wherein translating the second memory range comprises replacing a plurality of upper bits in the second memory range with corresponding bits from the first memory range.

36. The system of claim 35, wherein the first memory range and the second memory range are determined by base address registers.

37. The system of claim 1, wherein the MCPU domain is a Peripheral Component Interconnect Express (PCIe) domain.

38. The system of claim 1, wherein the host domain is a Peripheral Component Interconnect Express (PCIe) domain of at least one of the plurality of independent host computers.

39. The system of claim 1, wherein the device interfaces and the host interfaces comprise at least one of an encapsulation protocol and a decapsulation protocol for Peripheral Component Interconnect Express (PCIe) traffic to traverse the transport fabric.

40. The system of claim 1, wherein the MCPU discovers and initializes the plurality of independent IO devices.

41. The system of claim 40, wherein the MCPU runs a privileged driver for each IO device of the plurality of independent IO devices, wherein the privileged driver controls the IO device.

42. The system of claim 1, wherein the plurality of independent IO devices include an IO device with one endpoint function (EPF), wherein the MCPU assigns the IO device with one EPF to a single host computer, wherein the single host computer has privileged control over the EPF.

43. The system of claim 1, wherein the plurality of independent IO devices include an IO device with a plurality of endpoint functions (EPFs), wherein the IO device with the plurality of EPFs is shared across a set of host computers of the plurality of independent host computers.

44. The system of claim 1, wherein each host interface comprises a device proxy including configuration data.

45. The system of claim 44, wherein the configuration data comprises a bus-device-function (BDF) number in the host domain.

46. The system of claim 44, wherein the configuration data comprises a memory range identifier.

47. The system of claim 44, wherein the configuration data comprises an endpoint function (EPF) identifier of an EPF of at least one IO device reserved for use by the corresponding host computer.

48. The system of claim 44, wherein the configuration data comprises a destination address of a device interface corresponding to an endpoint function (EPF) of at least one IO device reserved for use by the corresponding host computer.

49. The system of claim 44, wherein configuration accesses to the device proxy are directed to the MCPU, wherein the MCPU controls configuration of the EPFs and updates the host computer with current configuration status.

50. The system of claim 1, wherein the plurality of independent IO devices are coupled to the transport fabric using a Peripheral Component Interconnect Express (PCIe) interface.

51. A system comprising:
a plurality of device interfaces coupled to a transport fabric and to a plurality of independent input/output (IO) devices that are initialized in a first domain;
a plurality of host interfaces coupled to the transport fabric, wherein each host interface couples to a host computer of a plurality of independent host computers and exposes functions of the plurality of independent IO devices to the host computer, each host computer of the plurality of independent host computers accessing the functions from a host domain that is an independent domain specific to the host computer performing the access, wherein the first domain is different from the host domain;
a management central processor unit (MCPU) coupled to a transport fabric, the MCPU configured to assign the functions to each host computer and populate a proxy device of each host interface with configuration information for each assigned function; and
wherein each host interface is configured to generate a hot-plug event in the host computer in response to assignment or un-assignment of a function to the host computer by the MCPU and population of the proxy device with the configuration information for the function.

52. A method comprising:
coupling a plurality of device interfaces to the transport fabric and to a plurality of independent input/output (IO) devices that are initialized in a first domain;
coupling a plurality of host interfaces to the transport fabric by coupling each host interface to a corresponding host computer of a plurality of independent host computers;
exposing, using the plurality of host interfaces, assigned functions corresponding to particular IO devices of the plurality of independent IO devices to the corresponding host computer; and
receiving and encapsulating, in the plurality of host interfaces, data packets from the corresponding host computer that are intended for the assigned endpoint functions and thereby route the data packets to the particular IO devices.

53. The method of claim 52, comprising sharing a plurality of endpoint functions (EPFs) of the plurality of independent IO devices across the plurality of independent host computers.

54. The method of claim 53, comprising controlling transfer of data between the plurality of independent host computers and the plurality of independent IO devices by managing source addresses of a host interface proxy of each host interface and destination addresses of each EPF of each IO device.

55. The method of claim 54, comprising receiving a data packet at a host interface, the data packet including a data payload.

56. The method of claim 55, comprising identifying a source address of the host interface proxy of the host interface.

57. The method of claim 56, comprising identifying a destination address of a device interface corresponding to an EPF to which the data packet will be routed.

58. The method of claim 57, wherein the destination address of the device interface is an Ethernet destination address.

59. The method of claim 57, comprising identifying an EPF identifier corresponding to the EPF.

60. The method of claim 59, comprising generating a data capsule by adding a header to the data payload of the data packet, the header comprising the EPF identifier.

61. The method of claim 60, comprising, using a combination of the destination address and the header, transferring the data capsule to the EPF.

62. The method of claim 60, comprising, using the destination address, transferring the data capsule to the device interface via the transport fabric.

63. The method of claim 60, comprising, using the header, transferring the data capsule to the EPF.

64. The method of claim 53, comprising controlling transfer of data between the plurality of independent host computers and the plurality of independent IO devices by managing source addresses of an EPF of each IO device and destination addresses of a host interface proxy of each host interface.

65. The method of claim 64, comprising receiving a data packet at a device interface of an IO device that includes an EPF, the data packet including a data payload, wherein the data is addressed to a host computer.

66. The method of claim 65, comprising identifying a source address of the device interface corresponding to the EPF.

67. The method of claim 66, comprising identifying a destination address of a host interface corresponding to a host interface proxy of a host computer to which the data packet will be routed.

68. The method of claim 67, wherein the destination address of the host interface is an Ethernet destination address.

69. The method of claim 67, comprising identifying a proxy identifier corresponding to the host interface proxy.

70. The method of claim 69, comprising generating a data capsule by adding a header to the data payload of the data packet, the header comprising the proxy identifier.

71. The method of claim 70, comprising, using a combination of the destination address and the header, transferring the data capsule to the host computer.

72. The method of claim 70, comprising, using the destination address, transferring the data capsule to the host interface.

73. The method of claim 70, comprising, using the header, transferring the data capsule to the host interface proxy.

74. The method of claim 52, each host interface comprising a proxy corresponding to each EPF reserved for use by a corresponding host computer corresponding to the host interface.

75. The method of claim 74, comprising translating parameters between the first domain and the host domain.

76. The method of claim 75, wherein the parameter is a sender identification.

77. The method of claim 76, comprising discovering and enumerating the plurality of independent IO devices in the first domain.

78. The method of claim 77, comprising assigning to each EPF of the plurality of EPFs a first bus-device-function (BDF) number in the first domain, wherein the first BDF number is unique to the first domain.

79. The method of claim 78, wherein the corresponding host computer discovers and enumerates the proxy in the host domain using a second BDF number, wherein the second BDF number is unique to the host domain and is different than the first BDF number.

80. The method of claim 79, comprising translating the BDF number between the first domain and the host domain during accesses to and from the EPF.

81. The method of claim 80, comprising translating the BDF number in the host interface.

82. The method of claim 80, comprising translating the BDF number in the device interface.

83. The method of claim 80, comprising translating the BDF number of the first domain to a BDF number of the host domain during accesses to the EPF.

84. The method of claim 80, comprising translating the BDF number of the host domain to a BDF number of the first domain during accesses from the EPF.

85. The method of claim 75, wherein the parameter is a memory address.

86. The method of claim 85, comprising assigning to each EPF of the plurality of EPFs a first memory range in the first domain, wherein the first memory range is unique to the first domain.

87. The method of claim 86, comprising assigning to each proxy a second memory range in the host domain, wherein the second memory range is unique to the host domain.

88. The method of claim 87, comprising determining a memory range identifier that identifies the second memory range corresponding to a packet received at a proxy of a receiving host interface, wherein the packet is an address-routed packet.

89. The method of claim 88, comprising transferring the memory range identifier to a destination EPF along with the packet.

90. The method of claim 89, comprising, using the memory range identifier, identifying the first memory range in the first domain that corresponds to the second memory range.

91. The method of claim 90, comprising translating the second memory range to the first memory range.

92. The method of claim 91, wherein the translating comprises replacing a plurality of upper bits in the second memory range with corresponding bits from the first memory range.

93. The method of claim 92, wherein the first memory range and the second memory range are determined by base address registers.

94. The method of claim 52, wherein the first domain is a Peripheral Component Interconnect Express (PCIe) domain.

95. The method of claim 52, wherein the host domain is a Peripheral Component Interconnect Express (PCIe) domain of at least one of the plurality of independent host computers.

96. The method of claim 52, wherein the device interfaces and the host interfaces comprise at least one of an encapsulation protocol and a decapsulation protocol for Peripheral Component Interconnect Express (PCIe) traffic.

97. The method of claim 52, comprising discovering and initializing the plurality of independent IO devices.

98. The method of claim 97, comprising running a privileged driver for each IO device of the plurality of independent IO devices, wherein the privileged driver controls the IO device.

99. The method of claim 52, wherein the plurality of independent IO devices include an IO device with one endpoint function (EPF), comprising assigning the IO device with one EPF to a single host computer, wherein the single host computer has privileged control over the EPF.

100. The method of claim 52, wherein the plurality of independent IO devices include an IO device with a plurality of endpoint functions (EPFs), wherein the IO device with the plurality of EPFs is shared across a set of host computers of the plurality of independent host computers.

101. The method of claim 52, wherein each host interface comprises a proxy including configuration data.

102. The method of claim 101, wherein the configuration data comprises a bus-device-function (BDF) number in the host domain.

103. The method of claim 101, wherein the configuration data comprises a memory range identifier.

104. The method of claim 101, wherein the configuration data comprises an endpoint function (EPF) identifier of an EPF of at least one IO device reserved for use by the corresponding host computer.

105. The method of claim 101, wherein the configuration data comprises a destination address of a device interface corresponding to an endpoint function (EPF) of at least one IO device reserved for use by the corresponding host computer.

106. The method of claim 101, comprising controlling configuration of the EPFs and updating the host computer with current configuration status.

* * * * *